(12) United States Patent
Barak

(10) Patent No.: US 9,098,384 B2
(45) Date of Patent: Aug. 4, 2015

(54) RUNTIME CONNECTION SUGGESTION ENGINE FOR PORTAL CONTENT

(75) Inventor: Nimrod Barak, Tel Aviv (IL)

(73) Assignee: SAP Portals Israel Ltd, Ra'anana (IL)

( * ) Notice: Subject to any disclaimer, the term of this patent is extended or adjusted under 35 U.S.C. 154(b) by 203 days.

(21) Appl. No.: 13/439,211

(22) Filed: Apr. 4, 2012

(65) Prior Publication Data

US 2013/0268836 A1 Oct. 10, 2013

(51) Int. Cl.
*G06F 17/00* (2006.01)
*G06F 17/30* (2006.01)
*G06F 17/22* (2006.01)

(52) U.S. Cl.
CPC .......... *G06F 17/00* (2013.01); *G06F 17/30873* (2013.01); *G06F 17/2247* (2013.01)

(58) Field of Classification Search
CPC ... G06F 17/2247; G06F 17/24; G06F 17/211; G06F 17/3089; G06F 17/30905
USPC .......................................................... 715/234
See application file for complete search history.

(56) References Cited

U.S. PATENT DOCUMENTS

| 7,984,417 B2 | 7/2011 | Ben-Zvi et al. | |
| 2005/0144158 A1* | 6/2005 | Capper et al. | 707/3 |
| 2007/0198969 A1* | 8/2007 | Facemire et al. | 717/107 |
| 2008/0263090 A1* | 10/2008 | Roy-Chowdhury et al. | 707/103 X |
| 2009/0271256 A1* | 10/2009 | Toebes et al. | 705/14 |
| 2009/0313295 A1* | 12/2009 | Blaxland et al. | 707/103 R |
| 2010/0325122 A1* | 12/2010 | Yassin | 707/759 |
| 2011/0138292 A1* | 6/2011 | Falkenberg et al. | 715/738 |

OTHER PUBLICATIONS

"Web Content Management: Web page Composer in SAP NetWeaver Portal," SAP, [online], Sep. 11, 2007, 2 pages, <http://scn.sap.com/docs/DOC-7892>, retrieved Apr. 4, 2012.

* cited by examiner

*Primary Examiner* — Scott Baderman
*Assistant Examiner* — Seung Jung
(74) *Attorney, Agent, or Firm* — Fish & Richardson P.C.

(57) ABSTRACT

The present disclosure involves systems, software, and computer implemented methods for identifying suggested connections between content within a portal webpage. One example process includes operations for identifying a portal page associated with two or more individual content components to be presented to a user, and determining at least one possible connection between at least one pair of the two or more individual content components based, at least in part, on related content component metadata associated with each determined pair of individual content components. The at least one determined possible connection is prioritized based, at least in part, on a combined set of at least one of the related content component metadata and a set of user-specific data. At least a portion of the prioritized possible connections are then presented as suggested connections within the portal page.

15 Claims, 6 Drawing Sheets

RUNTIME CONNECTION SUGGESTION ENGINE FOR PORTAL CONTENT

TECHNICAL FIELD

The present disclosure relates to computer-implemented methods, software, and systems for identifying suggested connections between content within a portal webpage.

BACKGROUND

Enterprise portals are frameworks for integrating information, people and processes across organizational boundaries. Portals can provide a secure unified access point, often in the form of a web-based user interface, and are designed to aggregate and personalize information through application-specific portlets and components. One hallmark of enterprise portals is the decentralized content contribution and content management, which keeps the information always updated. In many cases, specific portal pages may be defined by a highly experienced administrator using a portal content administration environment or a key user within a particular organization using specific tools to define aspects, relationships, and connections for and between content provided within specific portal pages.

SUMMARY

The present disclosure involves systems, software, and computer implemented methods for identifying suggested connections between content within a portal webpage. One example process includes operations for identifying a portal page associated with two or more individual content components to be presented to a user, and determining at least one possible connection between at least one pair of the two or more individual content components based, at least in part, on related content component metadata associated with each determined pair of individual content components. The at least one determined possible connection is prioritized based, at least in part, on a combined set of at least one of the related content component metadata and a set of user-specific data. At least a portion of the prioritized possible connections are then presented as suggested connections within the portal page.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
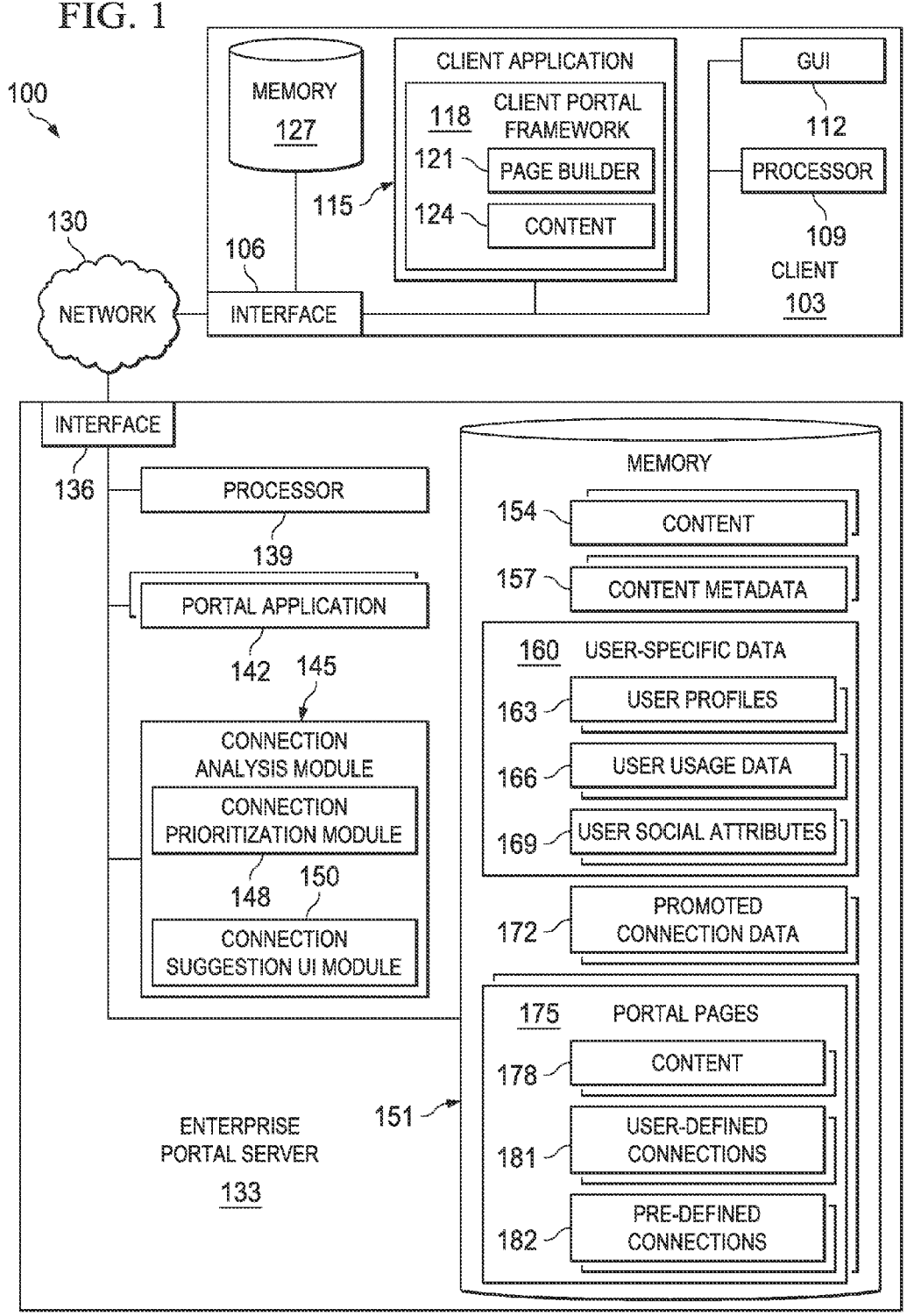
FIG. 1 is a block diagram illustrating an example system for identifying suggested connections between content included within a portal webpage.

The present disclosure relates to computer-implemented methods, software, and systems for identifying suggested connections between content within a portal webpage. For the purposes of this disclosure, an enterprise portal, also known as an enterprise information portal (EIP) or a corporate portal, is a framework for integrating information, people, and processes across organizational boundaries. The enterprise portal provides a secure unified access point, often in the form of a Web-based user interface, and is designed to aggregate and personalize information through application-specific portals. The enterprise portal is the de-centralized content contribution and content management system, which keeps the information always updated. With only a Web browser, users can begin work once they have been authenticated in the portal which offers a single point of access to information, enterprise applications, and services both inside and outside an organization. Portals may present information from diverse sources in a unified and structured way, and provide additional services, such as dashboards, an internal search engine, e-mail, news, enterprise portal navigation tools, and various other features. Portals are often used by enterprises for providing their employees, customers, and possibly additional users with a consistent look and feel, and access control and procedures for multiple applications, which otherwise would have been separate entities altogether.

Enterprise portal users are exposed to large amounts of content within various pages of the portal on which they may have very little control, as the underlying layout of the portal pages may be predefined or designed by authorized administrators and/or portal page composers. In some of the pages that users work with and consume, particularly the more complex pages that include business content of certain types, users may wish to create and/or cause interaction between related content parts. This interaction may provide a broader view of the presented data, and enhance functionality within the portal. In certain use cases, these advantages can be achieved by designing pages in which content parts are wired together, thereby allowing information to be shared between and used by otherwise disparate content parts within the portal page. However, in some cases, especially when the portal page's creator is not an advanced administrator, or in cases in which the type of desired or possible connection cannot be foreseen, a runtime control and updated wiring between portions of the content may be needed in order to achieve the desired results of the portal page's end-user. One potential solution can be to dedicate a set of pages and/or dashboards per user, but this approach is not scalable and causes a high(er) total cost of ownership (TCO) for the customer.

The goal of the present disclosure is to provide an automatic wiring analysis mechanism for runtime scenarios in which the content provided in a particular portal page is analyzed. According to certain specifications and information associated with the individual components within the page, as well as information associated with the user, the analysis mechanism can suggest certain possible connections between the content parts provided within the portal page. The specifications and information used in the analysis may include, but are not limited to, characteristics of the user (e.g., user and usage history data, usage information, user social attribute information, etc.), of the content itself (e.g., content metadata defined by the content's creator, metadata defined by users providing further understanding of the particular components), and organizational information (e.g., promoted connections defined by portal governance). While loading the page, the smart logic of the analysis mechanism is operated and one or more potential connections can be suggested to the user in a sophisticated user interface. In some instances, the user may be provided the opportunity to view or receive visual indications of related information within the content based on the suggested connections, as well as a relative ranking of the suggested connections.

FIG. 1 is a block diagram illustrating an example system 100 for identifying suggested connections between content included within an enterprise portal webpage. Specifically, the illustrated environment 100 includes or is communicably coupled with one or more clients 103, an enterprise portal server 133, and a network 130.

In general, the enterprise portal server 133 is a server that stores one or more portal applications 142, where at least a portion of the portal applications 142 are executed via requests and responses sent to users or clients within and communicably coupled to the illustrated environment 100 of FIG. 1. In some implementations, the enterprise portal server 133 may store a plurality of various portal applications 142. In other implementations, the enterprise portal server 133 may be a dedicated server meant to store and execute only a single portal application 142. In some implementations, the enterprise portal server 133 may comprise a Web server, where the portal applications 142 represent one or more Web-based applications accessed and executed by the client 103 via the network 130 or directly at the enterprise portal server 133 to perform the programmed tasks or operations of the portal application 142.

At a high level, the enterprise portal server 133 comprises an electronic computing device operable to receive, transmit, process, store, or manage data and information associated with the environment 100. Specifically, the enterprise portal server 133 illustrated in FIG. 1 is responsible for receiving application requests, for example, enterprise portal navigation requests, from one or more client applications associated with the client 103 of the environment 100 and responding to the received requests by processing said requests in the associated portal application 142, and sending the appropriate response from the portal application 142 back to the requesting client application 115. In addition to requests from the client 103, requests associated with the portal applications 142 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single enterprise portal server 133, environment 100 can be implemented using two or more servers 133, as well as computers other than servers, including a server pool. Indeed, enterprise portal server 133 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated enterprise portal server 133 may be adapted to execute any operating system, including Linux, UNIX, Windows, Mac OS®, Java™, Android™, iOS or any other suitable operating system. According to one implementation, enterprise portal server 133 may also include or be communicably coupled with an e-mail server, a Web server, a caching server, a streaming data server, and/or other suitable server.

The enterprise portal server 133 also includes an interface 136, a processor 139, and a memory 151. The interface 136 is used by the enterprise portal server 133 for communicating with other systems in a distributed environment—including within the environment 100—connected to the network 130; for example, the client 103, as well as other systems communicably coupled to the network 130 (not illustrated). Generally, the interface 136 comprises logic encoded in software and/or hardware in a suitable combination and operable to communicate with the network 130. More specifically, the interface 136 may comprise software supporting one or more communication protocols associated with communications such that the network 130 or interface's hardware is operable to communicate physical signals within and outside of the illustrated environment 100.

As illustrated in FIG. 1, the enterprise portal server 133 includes a processor 139. Although illustrated as a single processor 139 in FIG. 1, two or more processors may be used according to particular needs, desires, or particular implementations of the environment 100. Each processor 139 may be a central processing unit (CPU), a blade, an application specific integrated circuit (ASIC), a field-programmable gate array (FPGA), or another suitable component. Generally, the processor 139 executes instructions and manipulates data to perform the operations of the enterprise portal server 133. Specifically, the processor 139 executes the functionality required to receive and respond to requests from the client 103, as well as to analyze portal page content and identify one or more suggested connections and wiring within that page to connect the portal page's included content.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The enterprise portal server 133 also includes a memory 151, or multiple memories 151. The memory 151 may include any type of memory or database module and may take the form of volatile and/or non-volatile memory including, without limitation, magnetic media, optical media, random access memory (RAM), read-only memory (ROM), removable media, or any other suitable local or remote memory component. The memory 151 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the enterprise portal server 133. Additionally, the memory 151 may include any other appropriate data, such as VPN applications, firmware logs and policies, firewall policies, a security or access log, print or other reporting files, as well as others.

As illustrated in FIG. 1, memory 151 includes or references data and information associated with and/or related to various portal pages, content, the end users of the portal, and organizational or business-related information, among others. As illustrated, memory 151 includes a plurality of content 154, content metadata 157, user-specific data 160, promoted connection data 172, and one or more portal pages 175. The content 154 includes local and remotely available information, functionality, and user interfaces (UIs) available for inclusion within portal pages. The content 154 may include text, multimedia, references to one or more external applications or functionality, or other information. A collection of one or more sets of content 154 may be included in a particular portal page 175, where the portal page 175 provides a single entry point for users to view, access, and interact with the collection of content 154 included therein. Further, different sets of content may be included in particular portal pages 175, and may be associated with particular users or sets of users, particular roles within an organization, or provided for general use. In one example, in a human resources (HR)-related portal page, content from internal to the organization, as well as its benefits coordinator and health plan provider, may be included within a single portal page 175. By accessing the portal page 175, employees can review their health benefits, identify local doctors (through a connection or wiring between a service provider list and an interactive map), and generally manage their health insurance and benefits.

As in the above example, particular portal pages 175 may be originally designed to include defined instances of particular content 178, as well as defined relationships and connections between those pieces of content 178 to allow for enhanced functionality and linking of data within the particular pieces of content 178. The pre-defined connections 182 may be specifically defined for those portal pages 175 by administrators or other high-level users. One or more user-defined connections 181 may also be associated with particular portal pages 175 as a result of the analysis and association described herein. In an enterprise portal environment, end users may be authorized or allowed to add available content 154 into particular portal pages 175 to provide further customization to their portal experience. In those instances, connections between the newly added content 154 and the existing content 178 are unlikely to be defined. However, the end user may not have the expertise and understanding to identify where connections may be available or advantageous. The present disclosure provides tools to identify potential connections between unconnected content 178 within the portal page 175, and suggest one or more connections that could be made by the end user without a need for a detailed understanding of the portal page 175 and the portal servers' architecture.

As illustrated, memory 151 includes content metadata 157 associated with available content 154, as well as content 178 included in one or more portal pages 175. The content metadata 157 can include a variety of information related to or defining the content 154/178. Some examples of such content metadata 157 includes information defined by developers of the corresponding content 154/178 (e.g., a summary of the content, inputs and outputs associated with the content, content classifications, content tagging for providing additional user-developed context to the content, and others), as well as information defined by other users (or the current user) in prior interactions with the content 154/178. In some instances, the source of the content metadata 157 may also be part of the content metadata 157, such as whether the information was provided or defined by the content developer or users associated with the portal environment. In other instances, content metadata 157 may be associated with the source of the content 154/178 when associated with an external application, component, or data source. For example, a Google Maps-related piece of content 154/178 may be associated with content metadata 157 identifying Google as the source of the data and information, the content's available inputs and outputs for data processing and interaction, as well as information on related resources and other pieces of content associated therewith. In some instances, users may be able to "tag" particular pieces of content to provide additional context for themselves and other users. In some instances, that information can be used as part of the content metadata 157 used to analyze the possible connections. For example, two pieces of content tagged with the term "sales" may be given an additional possibility of a possible connection. The tags may also be used in the prioritization process of possible connections described below. In some instances, content metadata 157 can be determined or identified based on the UI technology associated with the portal page 175. For example, the possible actions associated with buttons, tables, or other UI elements within a particular piece of content 154/178 may be used to determine related actions, events, messages, and information transformation within the content 154/178, and can be used to define how the content 154/178 may act or react.

Memory 151 further includes the sets of user-specific data 160. The user-specific data 160 may store information on a plurality of users within an organization, and may be tied to, associated with, or reference an enterprise user data store, such as an employee directory or profile system. The user-specific data 160 includes user profiles 163, user usage data 166, and user social attributes 169. The user profile 163 may be associated with a portal-specific profile, as well as an enterprise-wide user profile. The user profile 163 may associate one or more specific roles for each user, allowing for a role-based presentation of various portal pages 175. For example, users with the role of manager may be presented with additional or alternative content within certain portal pages 175, or alternative portal pages 175, as compared to users who are not associated with a manager role. In this example, users defined as a manager may be able to approve or deny vacation time requests and can view and interact with portal pages 175 associated with this process, while users who are not defined as managers may not have access to such portal pages 175. The user profile 163 may provide further information, such as the user's security and/or clearance level within the organization, particular permissions related to certain objects and information, as well as any other relevant information associated with a particular user.

The user usage data 166 may include information associated with prior connections defined or accepted by the particular user, both in the current portal page 175 and in other portal pages associated with the organization. This information can be used to identify similar possible connections in new portal pages 175 to those previously made, as well as to ensure that such prior connections are suggested where available. In addition to identifying such possible connections, the user usage data 166 may be used to assist the prioritization of possible connections within a set of multiple possible connections. For example, prior connections, or connections similar to prior connections, may be given a higher priority for the user suggestions, and assist in ordering the multiple possible connections to determine the suggested connections to be provided to the user.

The user's social attributes 169 define social and organizational relationships throughout the organization and, where possible, outside the immediate organization. The social attributes 169 may include or refer to information of connections used or defined by other users within the organization having the same or related roles as the current user. If another user in the same or similar role has defined or accepted a particular connection between two pieces of content 154/178, a similar suggestion may be provided to the current user when those two pieces of content 154/178 are available within the portal page 175. Similarly, the social attributes 169 may define other users with whom the current user consistently interacts on projects and other collaborations. Those other users' previously accepted connections may be provided a higher weight when such connections are available in the particular portal page 175. Similarly, the user's prior selections can be used when those other users are interacting with particular content 154/178 in the same and/or other portal pages 175.

Outside of the content metadata 157 and the user-specific data 160, a set of promoted connection data 172 may be available to influence the suggested connections. Promoted connection data 172 may be similar to rules or promoted connections as identified by administrators or users having a particular role level within the organization. The promoted connections identified in the promoted connection data 172 may provide possible connections with a higher weighting during prioritization of the possible connections within a portal page 175. Additional information may be associated with the promoted connection data 172, such as information to be provided to the user that describes why a particular promoted connection may be advantageous or useful. That additional information may be presented to the user at runtime when the set of suggested connections is provided.

Specifically, the enterprise portal server 133 includes a connection analysis module 145 for identifying one or more suggested connections between content 178 within a portal page 175. The connection analysis module 145 analyzes, at runtime, content metadata 157 associated with the various content 178 included in a particular portal page 175, the user-specific data 160 associated with the user accessing the particular portal page 175, and additional connection-relevant information derived at runtime from the UI technology associated with the portal environment. The connection analysis module 145 can first determine the possible connections between content 178 on the portal page 175, such as to connect inbound and outbound parameters. In some instances, the inbound and outbound parameters may be defined in association with the particular content 178 and included within the content metadata 157, and can be used to identify related content 178 and possible wiring or matches based on those parameters. In a second consideration, URL parameters of one piece of content can be compared against those of another piece of content to determine if possible matches and potential wiring are available. For example, if the URL parameters of an application's associated inbound event match or relate to an outbound event thrown by the other piece of content, a match may be available. Matching may be performed by an exact text comparison, a relative text comparison, and dictionary matches (i.e., customerID does not equal customerNumber). Other suitable matching and analysis can be performed by the connection analysis module 145 in other instances.

Once the possible connections are determined, those possible connections are prioritized to provide an ordered listing of at least a portion of the possible connections. The prioritization of the possible connections can be performed by a connection prioritization module 148. In FIG. 1 the connection prioritization module 148 is illustrated within the connection analysis module 145. The connection prioritization module 148 may also be included inherently within the connection analysis module 145, or it may be a separate component. Similarly, the connection analysis module 145 may be a part of inherent functionality of one or more of the portal applications 142, in some instances. The connection prioritization module 148 may use at least a portion of the information previously described to determine the best fits of the possible connections, and particularly, a relative ranking of the possible connections. Various weights may be provided to different information sets. For example, a possible connection that has been previously accepted or defined by the user, or by other users socially or organizationally connected to the user, may be given a higher weight than a possible connection that has not been. Further, if a possible connection corresponds to a promoted connection identified in the promoted connection data 172, it may be given a higher weight. In another example, if the possible connection includes a close match to the inputs and outputs of the two (or more) pieces of content 178, that connection can be rated higher than a corresponding possible connection where one input of a first piece of content is associated with only one output of a second piece of content. Restated, the connection prioritization module 148 can analyze the level of relationship between the pieces of content in a particular possible connection and can compare that relationship to the relationships of one or more other possible connections. In some instances, scores may be assigned based on the analysis. Some possible connections may not be included in the set of suggested contents to be provided to the user based on a low score or relative ranking. The score may be provided as a number, percentage, star representation (e.g., x out of 5 stars). Scores that do not meet a certain threshold may be removed in some instances. In others, a maximum number of suggested connections may be presented, such that when the possible connections exceed that number, only the top results are presented until that maximum number is reached. In some instances, the user may request to view additional possible connections after a first set is presented. A new set of suggested connections may then be provided to the user, using the next possible connections from the prioritized order. In some instances, the set of suggested connections may comprise only those possible connections that are presented to the user.

The connection analysis module 145 is also illustrated as including a connection suggestion UI module 150. The connection suggestion UI module 150 provides the ability to present the listing of suggested connections via the user interface through which the portal page 175 is being presented to the user. For example, the listing of suggested connections may be presented at the top of the portal page when connections are identified and suggested, presenting any suitable UI element to allow users to quickly and efficiently review the suggested connections. As described above, the suggested connections may be associated with a score or ranking which can be used to prioritize the results. That score or ranking can be presented to the user to provide an illustration as to the relative confidence or recommendation level of the particular suggested connections. For example, a first suggested connection may be associated with five stars, while a second suggested connection may be associated with two stars. Without providing any further details within the portal page 175, a user could immediately be made aware of the better match provided by the first suggested connection.

In some instances, the connection suggestion UI module 150 may provide an additional feature of visually identifying the sets of data—within each piece of content 178 associated with the suggested connection—that may be linked or otherwise associated if the suggested connection is selected and implemented. For example, if input to a text box in a first piece of content would affect a table and its data in a second piece of content, the text box and the affected table could be highlighted or otherwise visually indicated within the UI. By providing this indication, the potential effect of implementing a particular suggested connection can be instantly and clearly made understandable to users without technical expertise or further understanding.

When a suggested connection is selected to be made within the portal page 175, the connection may be created by the portal application 142 or the connection analysis module 145, as appropriate. Further, the selected suggested connection can be added to the user-defined connections 181 associated with a particular portal page 175. The user-defined connections 181 may be applied to each future consumption of the portal page 175 by the user. In some instances, the user-defined connections 181 may be included in the portal page 175 when consumed by other users. This may occur where the original user is an administrator or associated with a role that allows that user's user-defined connections to be associated with and used by one or more other users. The user-defined connections 181 may be assist in the prioritization analysis. In those instances, the user-defined connections 181 for a particular user may be associated with another user's social attribute 169 data, such as where the users are socially or organizationally related within the organization or computer systems associated with the enterprise portal server 133.

The illustrated environment of FIG. 1 also includes the client 103, or multiple clients 103. The client 103 may be any computing device operable to connect to or communicate with at least the enterprise portal server 133 via the network 130 using a wireline or wireless connection. In general, the client 103 comprises an electronic computer device operable to receive, transmit, process, and store any appropriate data associated with the environment 100 of FIG. 1.

The illustrated client 103 further includes a client application 115. The client application 115 is any type of application that allows the client 103 to request and view content on the client 103. In some implementations, the client application 115 can be and/or include a Web browser. In some implementations, the client-application 115 can use parameters, metadata, and other information received at launch to access a particular set of data from the server 133. Once a particular client application 115 is launched, a user may interactively process a task, event, or other information associated with the server 133, including one or more portal applications 142 and portal pages 175. Further, although illustrated as a single client application 115, the client application 115 may be implemented as multiple client applications in the client 103. In some instances, the client application 115 may be an agent or client-side version of the one or more portal applications 142.

The client application 115 is further illustrated as including a client portal framework 118. The client portal framework 118 assists the client application 115 in executing client-based operations associated with the enterprise portal applications 142. For example, the client portal framework 118 includes a page builder 121 and a set of content 124 included within a particular portal page 175. The page builder 121 is a component that is aware of the various pieces of content 124 included in the portal page(s) 175 being viewed, and is further responsible for communication between those pieces of content 124. The framework 118 can then identify defined connections and wiring between the pieces of content 124, and recognize events associated with those pieces of content 124 to allow them to communicate as indicated. When information needs to be returned to the portal application 142 at the enterprise portal server 133, or a third-party source associated with particular pieces of content, the framework 118 sends and receives that information via the client application 115. Via the page builder 121, the client portal framework 118, or the client application 115, users of the client 103 can define new connections on particular portal pages 175 being presented, such as through the functionality provided by the connection analysis module 145. In some instances, users may be able to dynamically customize portal pages 175. In those instances, users may be able to add content 124 to the portal page 175 they are viewing, thereby modifying the portal page 175. When changes are made, the changes can be returned to the portal application 142 and analyzed by the connection analysis module 145 to determine if the newly added content has any possible connections to the existing content within the portal page 175.

The illustrated client 103 further includes an interface 106, a processor 109, and a memory 127. The interface 106 is used by the client 103 for communicating with other systems in a distributed environment—including within the environment 100—connected to the network 130; for example, the enterprise portal server 133, as well as other systems communicably coupled to the network 130 (not illustrated). Generally, the interface 106 comprises logic encoded in software and/or hardware in a suitable combination and operable to communicate with the network 130. More specifically, the interface 106 may comprise software supporting one or more communication protocols associated with communications such that the network 130 or interface's hardware is operable to communicate physical signals within and outside of the illustrated environment 100.

As illustrated in FIG. 1, the client 103 includes a processor 109. Although illustrated as a single processor 109 in FIG. 1, two or more processors may be used according to particular needs, desires, or particular implementations of the environment 100. Each processor 109 may be a central processing unit (CPU), an application specific integrated circuit (ASIC), a field-programmable gate array (FPGA), or another suitable component. Generally, the processor 109 executes instructions and manipulates data to perform the operations of the client 103. Specifically, the processor 109 executes the functionality required to send requests to the enterprise portal server 133 and to receive and process responses from the enterprise portal server 133.

Further, the illustrated client 103 includes a graphical user interface (GUI) 112. The GUI 112 interfaces with at least a portion of the environment 100 for any suitable purpose, including generating a visual representation of a Web browser. In particular, the GUI 112 may be used to view and navigate various Web pages located both internally and externally to the enterprise portal server 133, including one or more portal pages 175. The GUI 112 associated with each client 103 may comprise a graphical user interface operable to, for example, allow the user of a client 103 to interface with at least a portion of the portal application 142 and its associated operations and functionality, as well as other applications. Generally, the GUI 112 provides the particular user with an efficient and user-friendly presentation of business data provided by or communicated within the system. The GUI 112 may comprise a plurality of customizable frames or views having interactive fields, pull-down lists, and buttons operated by the user. For example, the GUI 112 may provide interactive elements that allow a user to interact with a particular portal page 175, as well as other components within and/or external to environment 100. The different portions of the enterprise portal server's functionality may be presented and accessible to the user through the GUI 112, such as through the client application 115. Generally, the GUI 112 may also provide general interactive elements that allow a user to access and utilize various services and functions of a particular portal application 142. The GUI 112 may present information associated with the client application 115 for viewing and interaction. In general, the GUI 112 is often configurable, supports a combination of tables and graphs (bar, line, pie, status dials, etc.), and is able to build real-time portals, where tabs are delineated by key characteristics (e.g., site or micro-site). Therefore, the GUI 112 contemplates any suitable graphical user interface, such as a combination of a generic web browser, intelligent engine, and command line interface (CLI) that processes information in the platform and efficiently presents the results to the user visually.

The illustrated client 103 also includes a memory 127, or multiple memories 127. The memory 127 may include any memory or database module and may take the form of volatile or non-volatile memory including, without limitation, magnetic media, optical media, random access memory (RAM), read-only memory (ROM), removable media, or any other suitable local or remote memory component. The memory 127 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client 103. Additionally, the memory 127 may include any other appropriate data, such as VPN applications, firmware logs and policies, firewall policies, a security or access log, print or other reporting files, as well as others.

There may be any number of clients 103 associated with, or external to, the environment 100. For example, while the illustrated environment 100 includes one client 103, alternative implementations of the environment 100 may include multiple clients 103 communicably coupled to the enterprise portal server 133 and/or the network 130, or any other number suitable to the purposes of the environment 100. Additionally, there may also be one or more additional clients 103 external to the illustrated portion of environment 100 that are capable of interacting with the environment 100 via the network 130. Further, the term "client" and "user" may be used interchangeably as appropriate without departing from the scope of this disclosure. Moreover, while the client 103 is described in terms of being used by a single user, this disclosure contemplates that many users may use one computer, or that one user may use multiple computers.

The illustrated client 103 is intended to encompass any computing device such as a desktop computer, laptop/notebook computer, wireless data port, smart phone, personal data assistant (PDA), tablet computing device, one or more processors within these devices, or any other suitable processing device. For example, the client 103 may comprise a computer that includes an input device, such as a keypad, touch screen, or other device that can accept user information, and an output device that conveys information associated with the operation of the enterprise portal server 133 or the client 103 itself, including digital data, visual information, or a GUI 112, as shown with respect to the client 103.

Figure 2:
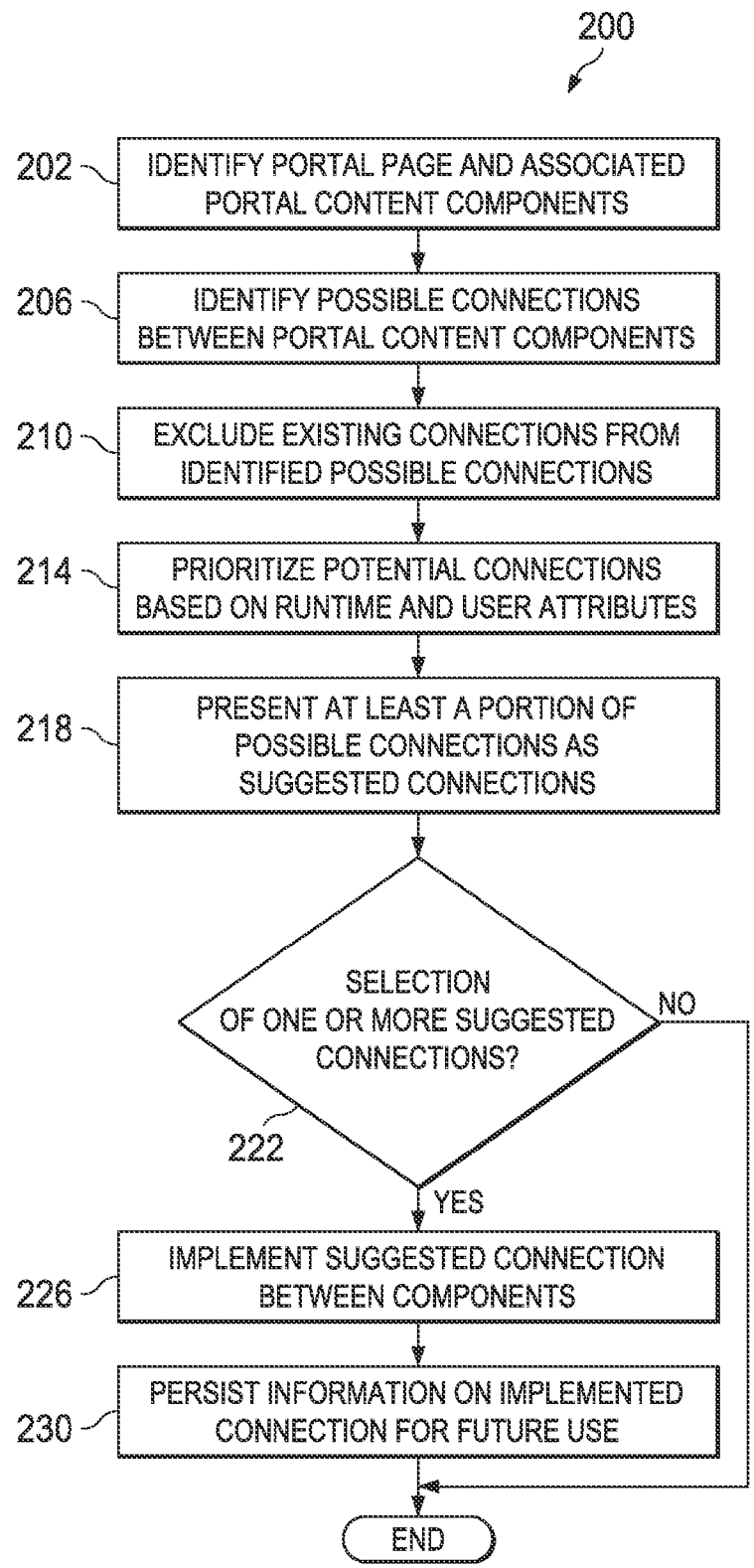
FIG. 2 is a flowchart of an example method for initially identifying suggested connections between content included within a particular portal webpage.

FIG. 2 is a flowchart of an example method 200 for initially identifying suggested connections between content included within a particular portal webpage. For clarity of presentation, the description that follows generally describes method 200 in the context of FIG. 1. However, it will be understood that method 200 may be performed, for example, by any other suitable system, environment, software, and hardware, or a combination of systems, environments, software, and hardware, as appropriate. For example, one or more of the enterprise portal server, the client, or other computing device (not illustrated) can be used to execute method 200 and obtain any data from the memory of the client, the enterprise portal server, or the other computing device (not illustrated).

At 202, a portal page and its associated pieces of portal content (or portal content components) are identified in preparation for serving the portal page to a client. The portal page may include multiple portal content components providing different types and sets of information and displays. Some of the portal content components may have pre-defined connections within the portal page to one or more of the other portal content components. The present method 200 provides a method for identifying and suggesting potential connections that are not initially defined between the components, and which can be implemented by users interacting with the portal page.

At 206, one or more possible or potential connections between content components are identified from the content components included in the identified portal page. Possible connections may be identified based on one or more of the following: metadata associated with each of the content components that corresponds or relates to another of the portal content components, matching or related UI elements associated with each of the portal content components, and other suitable criteria. Example analysis determinations and possible algorithms are described in relation to the connection analysis module 145 of FIG. 1. In some instances, one or more possible connections may be identified. At 210, the existing connections associated with the portal page can be removed from the plurality of possible connections.

At 214, the one or more possible connections can be prioritized based on various runtime and system attributes. Prioritization of the possible connections can be based on various factors and information. For example, the respective level of correspondence between the actual data and information within pairs of portal content components can be measured and used as one factor in the determination. In another instance, some possible connections may be identified as promoted connections, such that additional weighting or consideration may be provided to those possible connections when they are included in the one or more identified possible connections. The promoted connections may be based on organizational knowledge of the successful and/or useful integration of specific components in other instances or portal pages, such that these known connections are given some preference in prioritization. Another alternative prioritization criteria includes user-related information, such as information on prior connections defined by the user, as well as the connections defined by related or similar users elsewhere within or outside the organization associated with the portal page. A social or organization map may identify frequent collaborators of the user, users in similar roles as the user, or other relationship information that can assist in determining prioritized connections. Other suitable prioritization techniques and considerations can be used, where appropriate.

At 218, at least a portion of the possible connections are presented to the client. The presented portion of the possible connections may be considered "suggested connections." The portion of the possible connections presented may be based on a relative ranking of the possible connections after the prioritization process is complete. For example, each possible connection may be given a score, ranking, or other valuation based on the prioritization techniques and parameters. A threshold score, ranking, or valuation may be defined, such that possible connections meeting or exceeding that threshold are included in the presented, or suggested, connections, while the possible connections not meeting the threshold are not presented. In some instances, particularly where a large number of possible connections exist, the threshold may instead be a predefined or determined number of x results. The x number of highest ranked possible connections are then presented as suggested connections, while the rest of the possible connections are not presented. The suggested connections can be presented to a dedicated portion of a GUI at the client associated with the portal page, allowing users at the client to review and potentially select one or more of the suggested connections for implementation within the portal page. An example of a GUI presenting the suggested connections is provided in FIG. 6, discussed below.

At 222, a determination is made as to whether user selection of a particular suggested connection is received. The selection can be received via the portal page at the client and communicated to portal server or system. If no selection is received, method 200 ends. If, however, a selection of one or more suggested connections is received, method 200 continues at 226.

At 226, in response to the selection by the user, the one or more selected suggested connections are implemented, or created, between the portal content components. Implementing the connections can include associating URL parameters, which can be passed between particular pieces of content at runtime. THe connections, or wiring, can be persisted such that the connection is maintained. In some instances, the wiring may be associated with a particular user within a personalization layer, while in others, the wiring may be made active or provided to other users in addition to the particular user who implemented the wiring relationship between the components. If inbound and outbound connections are wired, data can be stored within the content components and passed between them once the connection has been approved. In some instances, the content components may be iViews, portlets, or other suitable portal-related content technology. In some additional instances, operations of the UI associated with the portal page may be interfered with, such that the rendering of the UI technology itself is modified. The modifications may include, in some instances, passing of relevant parameters from one content component to the controls of a second content component (e.g., for table selection in a second content component in response to a selection of a related item in a first content component). Other suitable means for implementing the selected connection can also be used. Once implemented, at least some of the actions performed in and events occurring in association with one of the newly connected components can be shared with the corresponding connected component in the suggested connection.

At 230, information on the newly created connection is persisted for future use with the identified portal page. When the user consumes the page in the future, the newly created connection will be included within the portal page when loaded. Additionally, the persisted information can be used in association with the user of the client to assist in identifying and prioritizing additional possible connections in other portal pages during further use. Still further, the newly created connection can be used to prioritize other users' possible connections, particularly where those other users are related to or associated with the current user, as described above. Once the information is stored, method 200 can end.

Figure 3:
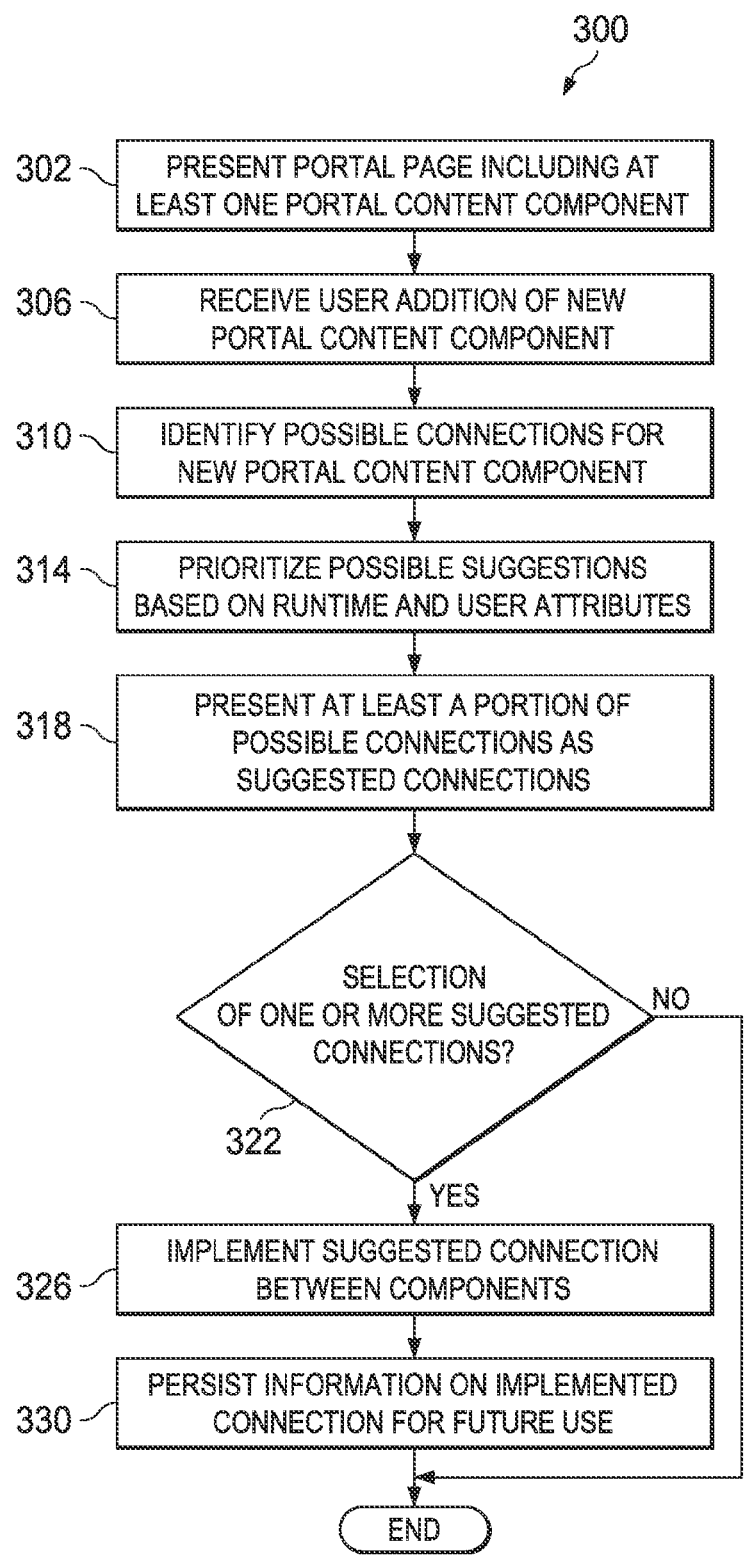
FIG. 3 is a flowchart of an example method for identifying suggested connections between content included within a portal webpage in response to user modifications to a particular portal webpage.

FIG. 3 is a flowchart of an example method 300 for identifying suggested connections between content included within a portal webpage in response to user modifications to a particular portal webpage. For clarity of presentation, the description that follows generally describes method 300 in the context of FIG. 1. However, it will be understood that method 300 may be performed, for example, by any other suitable system, environment, software, and hardware, or a combination of systems, environments, software, and hardware as appropriate. For example, one or more of the enterprise portal server, the client, or other computing device (not illustrated) can be used to execute method 300 and obtain any data from the memory of the client, the enterprise portal server, or the other computing device (not illustrated).

At 302, a portal page is presented to the client, where the portal page includes at least one portal content component capable of being wired, or connected, to another portal content component. In many instances, end users at the client may be able to dynamically modify or update their portal pages by adding content, widgets, gadgets, or other programs or applications to the page. In the present example, and particularly at 306, a new user addition of a portal content component is received. While in FIG. 2 the operations for identifying and suggesting connections were performed upon initial loading of the portal page, in FIG. 3 similar operations are performed whenever new portal content components are added to the portal page.

At 310, possible connections for the new portal content component with the one or more pre-existing portal content components are identified, similar to 206 of method 200. In this instance, only connections with the newly added portal content component need to be analyzed, although a full or partial analysis for additional possible connections could be initiated, similar to FIG. 2. At 314, the identified possible suggestions are prioritized based on the runtime and user attributes, similar to 218 of FIG. 2. At 318, at least a portion of the possible connections for the newly added portal content component can be presented as suggested connections.

At 322, a determination is made as to whether user selection of a particular suggested connection to the newly added portal content component is received. The selection can be received via the portal page at the client and communicated to the portal server or system. If no selection is received, method 300 ends. If, however, a selection of one or more suggested connections is received, method 300 continues at 326.

At 326, in response to the selection by the user, the one or more selected suggested connections are implemented, or created, between the portal content components, similar to the operations of 226 of FIG. 2. At 330, information on the newly created connection is persisted for future use with the identified portal page. Once the information is persisted and/or stored, method 300 can end.

Figure 4:
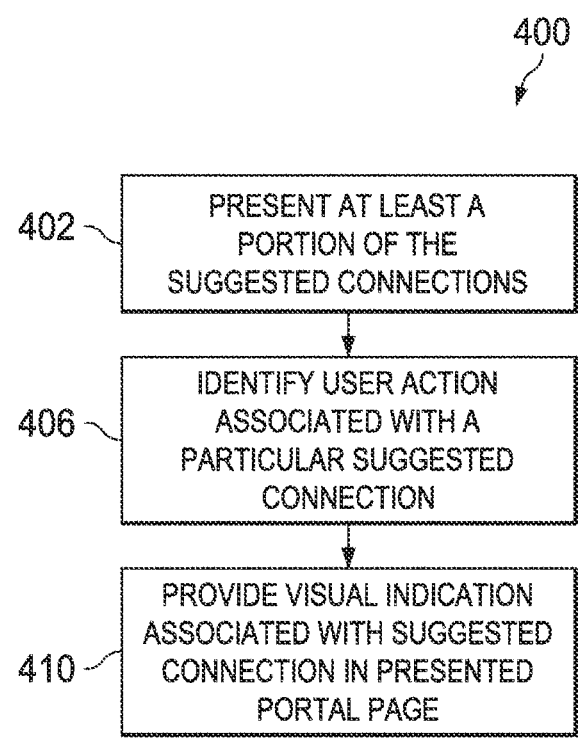
FIG. 4 is a flowchart of an example method for providing a visual illustration of selected suggested connections within the particular portal webpage.

FIG. 4 is a flowchart of an example method 400 for providing a visual illustration of selected suggested connection within the particular portal webpage. Method 400 may be performed, in reference to methods 200 and 300, after the possible connections are prioritized and presented as suggested connections, but before a user selection of a particular suggested connection is received (or the complete set of selected suggested connections are received). Providing a visual indication of the suggested connections allows users to view, within the portal page, how the different portal content components associated with a particular suggested connection are related. This can assist users in selecting the best suggested connections for implementation within the portal page.

Figure 5:
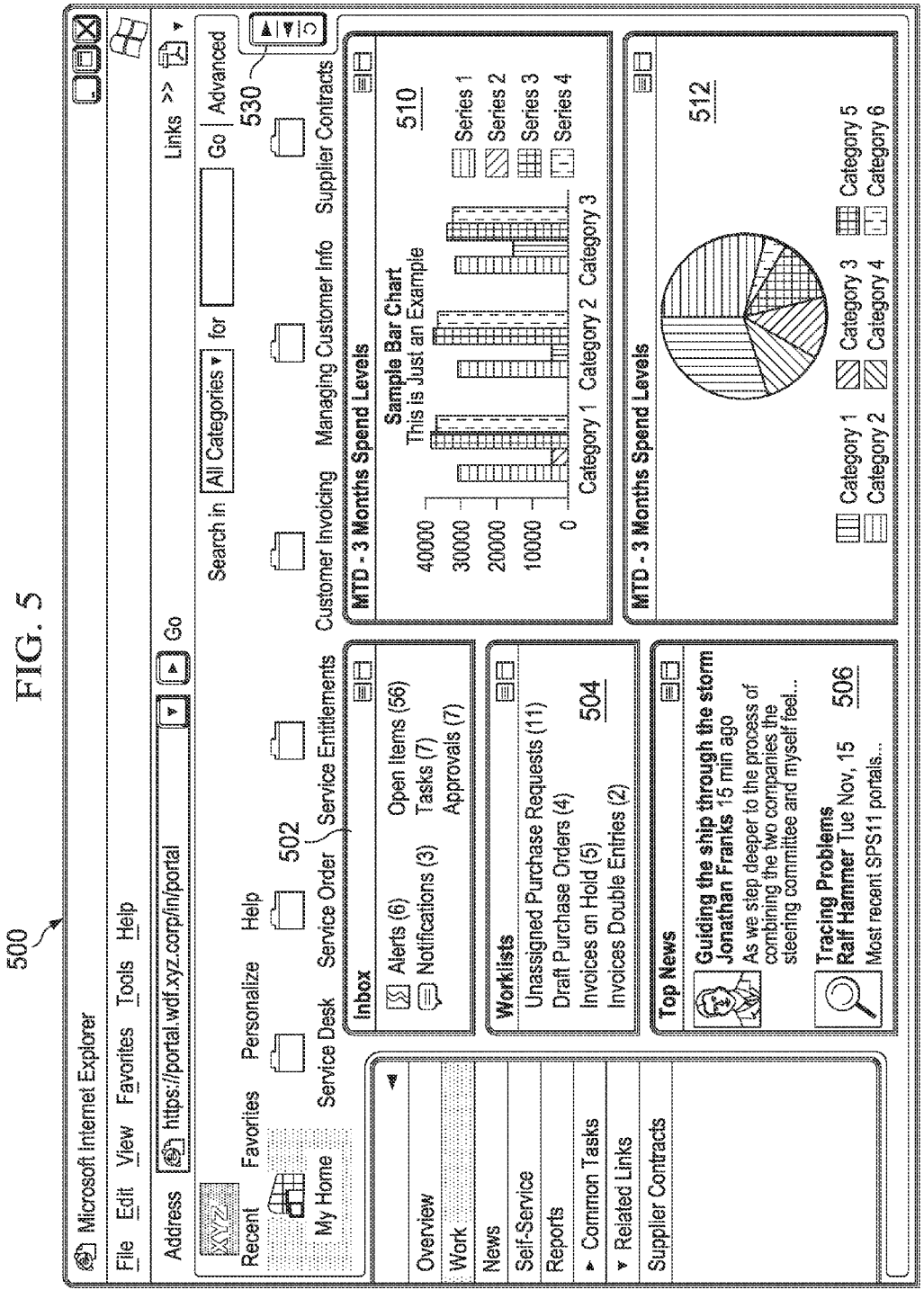
FIG. 5 illustrates an example enterprise portal page with a hidden suggested connections bar or menu.
Figure 6:
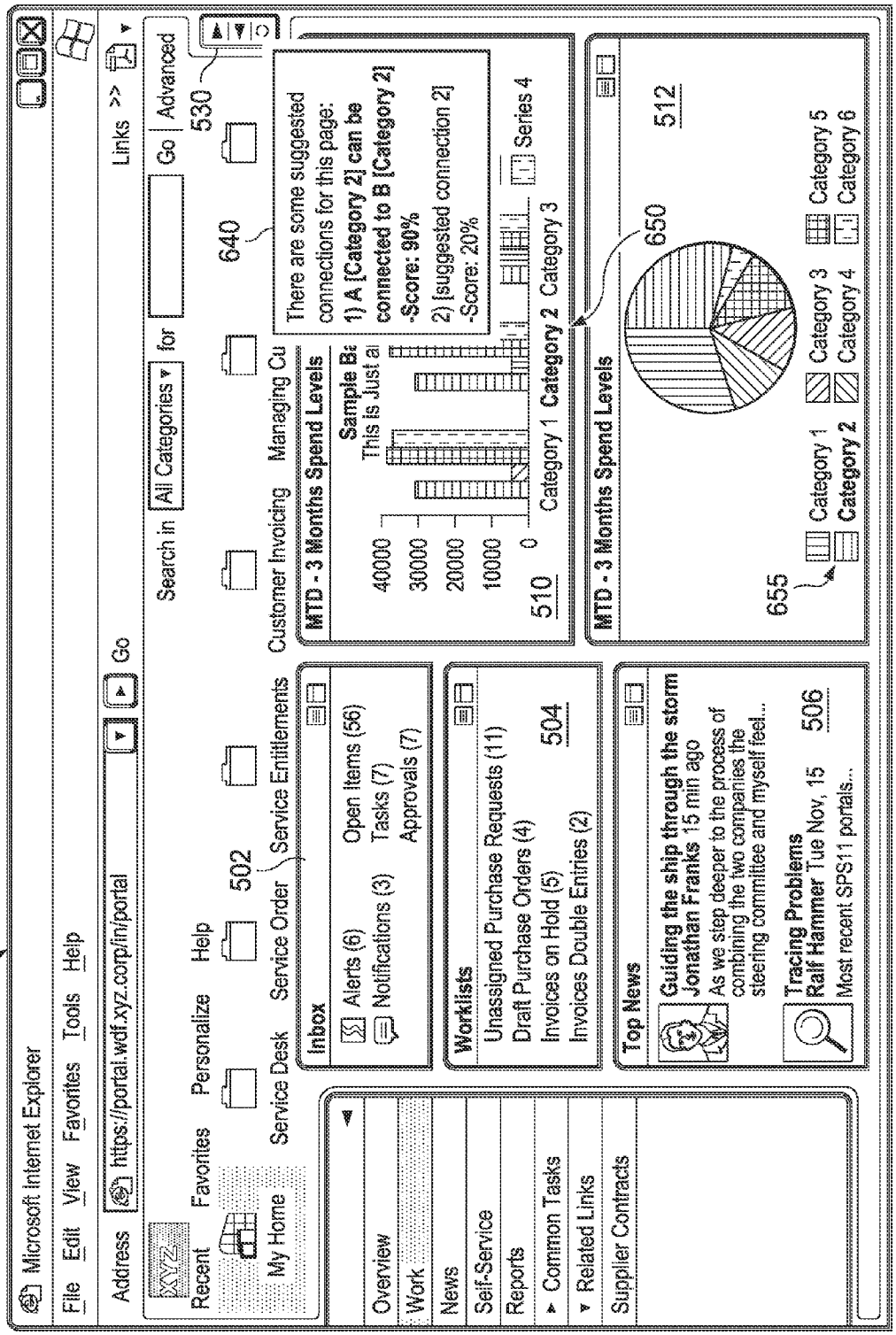
FIG. 6 illustrates an example enterprise portal page including a user interface (UI) for presenting at least one of the identified suggested connections to the end user.

At 402, at least a portion of the suggested connections is presented. In some instances, this presentation may be provided as an overlay upon the associated portal page, a sidebar, or a menu bar. FIG. 5 illustrates an example enterprise portal page 500 with a hidden suggested connections bar or menu 530. The portal page 500 includes five pieces of portal content components, an Inbox 502, a worklist 504, a top news widget 506, a bar chart 510 associated with spending, and a pie chart 512 associated with spending. The suggested connections bar or menu 530 may be expanded by the user, or alternatively, may automatically expand when suggested connections are presented. FIG. 6 illustrates the example enterprise portal page 500 with the expanded suggested connections menu 530, where expansion provides an overlay list of suggested connections 640.

Returning to method 400, at 406, some user action associated with the presented suggested connections is identified, where the user action particularly identifies one of the suggested connections. The user action may include a mouse-over, a keyboard shortcut, a touch-screen or gesture-pad indication, or any other suitable action. At 410, a visual indication associated with the suggested connection is provided or presented in the portal page. For example, the two portal content components associated with the suggested connection may be outlined, bolded, color-coded, or otherwise emphasized to provide users with a clear indication of the affected components. In some instances, the particular set of related information associated with the suggested connection may also be visually indicated, such as by highlighting, bolding, color-coding, or otherwise suitably indicating the particular data that would be affected by the connection. In FIG. 6, for example, portions of the bar chart 510 (see element 650) and the pie chart 512 (see element 655), both labeled "Category 2," are highlighted in response to the particular suggested connection from the list of suggested connections 640 being indicated by the user. Once a particular suggested connection is selected, the operations associated with implementing the connection can be performed.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method, the method comprising:
identifying a portal page including two or more individual portal content components to be presented to a user, wherein each of the individual portal content components comprises a portal-related content technology;
determining, using at least one computer, at least one possible connection between at least one pair of the two or more individual portal content components included in the portal page based, at least in part, on related portal content component metadata associated with each individual portal content component of the at least one pair, wherein the portal content component metadata includes a pre-defined output of a first portal content component and a pre-defined input of a second portal content component, and wherein determining the at least one possible connection between the at least one pair is based on determining a match between the pre-defined output of the first portal content component and the pre-defined input of the second portal content component;
prioritizing, using the at least one computer, the at least one determined possible connection based, at least in part, on a combined set of at least one of the related portal content component metadata and a set of user-specific data;
presenting at least a portion of the prioritized possible connections as suggested connections between the portal content components within the portal page; and
providing a visual indication within the portal page identifying at least a portion of the pair of portal content components associated with at least one of the presented suggested connections, wherein the visual indication identifies at least two elements within each of the pair of portal content components associated with the at least one of the presented suggested connection, and wherein the at least two elements are associated with at least one of a pre-defined input or output of the respective portal content component.

2. The method of claim 1, further comprising:
receiving an indication associated with user selection of a particular suggested connection via the portal page; and
implementing the particular suggested connection between the corresponding pair of individual portal content components.

3. The method of claim 2, further comprising:
persisting information on the implemented particular suggested connection for future use.

4. The method of claim 3, wherein the future use of the persisted information includes incorporating the implemented particular suggested connection into later instances of the portal page.

5. The method of claim 1, wherein the portal content component metadata includes one or more of the following: a defined input or output associated with the portal content component, a description of the portal content component, a source of the portal content component, and a user-defined content tag associated with the portal content component.

6. The method of claim 1, wherein the set of user-specific data includes at least one of the following: a user profile associated with the user, one or more prior connections selected by the user, and one or more connections defined by at least one other user related to the user.

7. The method of claim 1, wherein prioritizing the at least one determined possible connection is further based, at least in part, on one or more of the determined possible connections being promoted internally within an organization associated with the portal page.

8. A system comprising:
one or more computers associated with an enterprise portal; and
a computer-readable medium coupled to the one or more computers having instructions stored thereon which, when executed by the one or more computers, cause the one or more computers to perform operations comprising:
identifying a portal page including two or more individual portal content components to be presented to a user, wherein each of the individual portal content components comprises a portal-related content technology;
determining, using at least one computer, at least one possible connection between at least one pair of the two or more individual portal content components included in the portal page based, at least in part, on related portal content component metadata associated each individual portal content component of the at least one pair, wherein the portal content component metadata includes a pre-defined output of a first portal content component and a pre-defined input of a second portal content component, and wherein determining the at least one possible connection between the at least one pair is based on determining a match between the pre-defined output of the first portal content component and the pre-defined input of the second portal content component;
prioritizing, using the at least one computer, the at least one determined possible connection based, at least in part, on a combined set of at least one of the related portal content component metadata and a set of user-specific data;
presenting at least a portion of the prioritized possible connections between the portal content components as suggested connections within the portal page; and
providing a visual indication within the portal page identifying at least a portion of the pair of portal content components associated with at least one of the presented suggested connections, wherein the visual indication identifies at least two elements within each of the pair of portal content components associated with the at least one of the presented suggested connection, and wherein the at least two elements are associated with at least one of a pre-defined input or output of the respective portal content component.

9. The system of claim 8, the one or more computers further performing operations comprising:
receiving an indication associated with user selection of a particular suggested connection via the portal page; and
implementing the particular suggested connection between the corresponding pair of individual portal content components.

10. The system of claim 9, the one or more computers further performing operations comprising:
persisting information on the implemented particular suggested connection for future use.

11. The system of claim 10, wherein the future use of the persisted information includes incorporating the implemented particular suggested connection into later instances of the portal page.

12. The system of claim 8, wherein the portal content component metadata includes one or more of the following: a defined input or output associated with the portal content component, a description of the portal content component, a source of the portal content component, and a user-defined content tag associated with the portal content component.

13. The system of claim 8, wherein the set of user-specific data includes at least one of the following: a user profile associated with the user, one or more prior connections selected by the user, and one or more connections defined by at least one other user related to the user.

14. The system of claim 8, wherein prioritizing the at least one determined possible connection is further based, at least in part, on one or more of the determined possible connections being promoted internally within an organization associated with the portal page.

15. A computer program product encoded on a non-transitory storage medium, the product comprising computer readable instructions for causing one or more processors to perform operations comprising:
identifying a portal page including two or more individual portal content components to be presented to a user, wherein each of the individual portal content components comprises a portal-related content technology;
determining, using at least one computer, at least one possible connection between at least one pair of the two or more individual portal content components included in the portal page based, at least in part, on related portal content component metadata associated with each individual portal content component of the at least one pair, wherein the portal content component metadata includes a pre-defined output of a first portal content component and a pre-defined input of a second portal content component, and wherein determining the at least one possible connection between the at least one pair is based on determining a match between the pre-defined output of the first portal content component and the pre-defined input of the second portal content component;
prioritizing, using the at least one computer, the at least one determined possible connection based, at least in part, on a combined set of at least one of the related portal content component metadata and a set of user-specific data;
presenting at least a portion of the prioritized possible connections between the portal content components as suggested connections within the portal page; and
providing a visual indication within the portal page identifying at least a portion of the pair of portal content components associated with at least one of the presented suggested connections, wherein the visual indication identifies at least two elements within each of the pair of portal content components associated with the at least one of the presented suggested connection, and wherein the at least two elements are associated with at least one of a pre-defined input or output of the respective portal content component.

* * * * *